United States Patent [19]

Wainwright

[11] Patent Number: 4,901,919
[45] Date of Patent: Feb. 20, 1990

[54] AIR CONDITIONING INDIRECT HEATING AND RECUPERATIVE VENTILATION SYSTEM

[76] Inventor: Christopher E. Wainwright, 1246 West Kiowa Cir., Mesa, Ariz. 85202

[21] Appl. No.: 134,962

[22] Filed: Dec. 18, 1987

Related U.S. Application Data

[63] Continuation-in-part of Ser. No. 778,412, Sep. 20, 1985, Pat. No. 4,713,943, which is a continuation-in-part of Ser. No. 550,771, Nov. 9, 1983, abandoned, which is a continuation-in-part of Ser. No. 305,397, Sep. 25, 1981, abandoned.

[51] Int. Cl.⁴ ............................. F24F 7/00; F28D 5/00
[52] U.S. Cl. ........................................ 237/81; 62/304; 62/311
[58] Field of Search ................ 62/304, 309, 171, 311, 62/91, 271, 272; 237/81

[56] References Cited

U.S. PATENT DOCUMENTS 4,380,910  4/1983  Hood et al. ..................... 62/304 X
4,392,417  7/1983  Johannsen ........................ 98/1.5
4,426,853  1/1984  Mitani et al. ..................... 62/309

Primary Examiner—Henry A. Bennet

[57] ABSTRACT

A water evaporating air conditioning, indirect heating and recuperative ventilation system comprising an air to air counter-flow heat exchanger having separate supply and return heat exchange chambers that are separated by a heat exchange membrane, water in air saturation elements and air movement means is provided. Air from the external environment is supplied through supply heat exchange chamber to enclosed space and air from enclosed space is moved through return heat exchange chamber and then expelled to the external environment. In air conditioning, water is evaporated inside the return heat exchange chamber and heat is conducted across heat exchange membrane from the air in supply heat exchange chamber to cool air supplied to enclosed space. In heating, heat is provided to air from enclosed space before that air enters return heat exchange chamber and air supplied to enclosed space is heated by heat conduction across heat exchange membrane and heating of the air in supply heat exchange chamber.

7 Claims, 1 Drawing Sheet

AIR CONDITIONING INDIRECT HEATING AND RECUPERATIVE VENTILATION SYSTEM

This application, Ser. No. 07/134,962, filed on Dec. 18, 1987, by Christopher E. Wainwright for an "AIR CONDITIONING, INDIRECT HEATING AND RECUPERATIVE VENTILATION SYSTEM" is a Continuation-in-Part of application Ser. No. 778,412 filed on Sept. 20, 1985, by Christopher E. Wainwright for an "IMPROVED EVAPORATIVE COOLER", now U.S. Pat. No. 4,713,943, issued on Dec. 22, 1987, which in turn is a Continuation-in-Part of application Ser. No. 550,771, filed Nov. 9, 1983, by Christopher E. Wainwright for an "IMPROVED EVAPORATIVE COOLER", now abandoned, which in turn is a Continuation-in-Part of application Ser. No. 305,397, filed Sept. 25, 1981, by Christopher E. Wainwright for an "IMPROVED EVAPORATIVE COOLER", now abandoned, and this application is entitled to the filing date thereof.

BACKGROUND OF THE INVENTION

1. Field of the Invention

This invention relates to water evaporating air conditioning systems, heat recuperating ventilation systems and indirect heating systems that utilize air to air heat exchangers.

2. Description of The Prior Art

The concept of using evaporative cooler type air conditioning systems, recuperative ventilating systems, and heating systems to provide efficient methods of selectively heating or cooling air for the purpose of heating or cooling homes, apartments, industrial buildings, commercial buildings, house trailers, and other enclosures is old and well established in the art.

An improved system is disclosed and claimed in my previously filed application which issued on Dec. 22, 1987 as U.S. Pat. No. 4,713,943, entitled "EVAPORATIVE COOLER INCLUDING AN AIR-TO-AIR COUNTER-FLOW HEAT EXCHANGER WITH A REVERSE TEMPERATURE PROFILE". In this patent, an improved evaporative cooler is disclosed. However, even this system is not adapted to provide the maximum efficiency for the use as a heating system or for the use as a recuperative ventilation system.

Therefore, a long felt need has existed and continues to exist for an improved air conditioning and ventilating system capable of efficiently heating or cooling air to be supplied to the interior of an enclosed space while minimizing the heating and cooling losses normally associated with ventilation systems.

BRIEF SUMMARY OF THE INVENTION

It is an object of the present invention to economically and efficiently heat or cool the interior of an enclosed space, such as a room.

It is another object of the present invention to provide a simple and efficient method of ventilating an enclosed space.

It is still another object of the present invention to conserve heating and cooling energy during the ventilation of an enclosed space by heat recuperation.

It is yet another object of the present invention to provide a system, apparatus and method for heating the interior of an enclosed space.

It is another object of this invention to use the heat exchanger of an evaporative cooler air conditioning system to indirectly heat an enclosed space.

The present invention provides the Improved Evaporative Cooler of the earlier invention with the features of heat recuperating ventilation; in which, heat that is normally lost or gained, by the enclosed space with the exterior environment, in the ventilating air flow is recouped by means of the heat exchanger of the earlier invention.

The present invention also provides for the indirect heating of an enclosed space by means of an air to air heat exchanger. In this inventive system, the enclosed space is heated by the incoming ventilating air flow that enters that enclosed space; wherein, that incoming ventilating air flow is heated by a heat source located in the outgoing ventilating air flow that leaves that enclosed space, and wherein, heat from the outgoing ventilating air flow is transferred to the incoming air flow by means of an air to air heat exchanger.

These and other objects, features, and advantages of the present invention will be more fully apparent from the following detailed description of the preferred embodiments of the invention, the claims, and the accompanying drawings, which are briefly described hereinbelow.

DETAILED DESCRIPTION OF THE PREFERRED EMBODIMENTS

Figure 1:
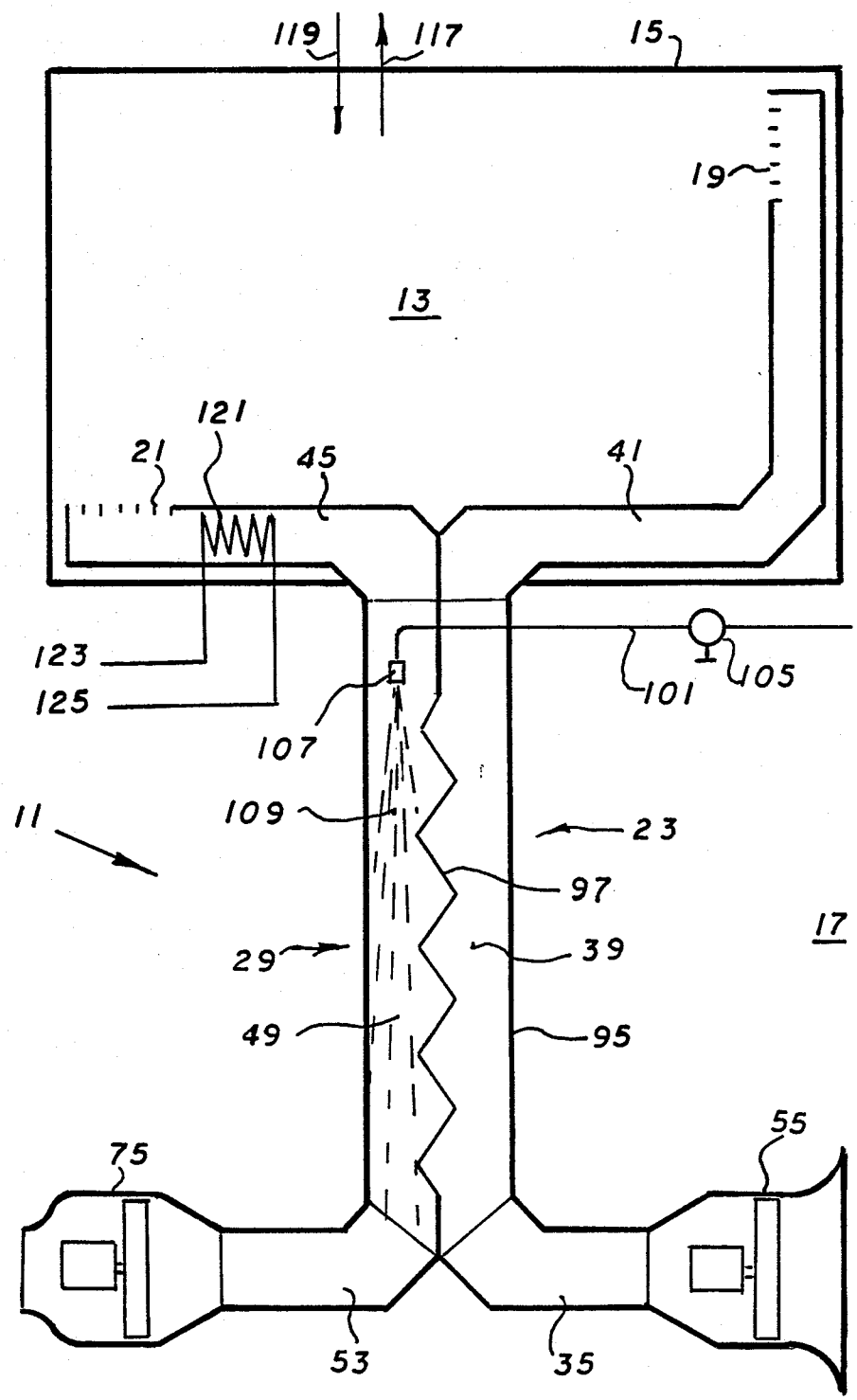
FIG. 1 is a sectional side view of the evaporative cooler type air conditioning, indirect heating and recuperative ventilating system of the present invention, illustrating a counter flow, air to air, heat exchanger, water saturation means, air movement means, air heating means and typical installation.

With reference to FIG. 1.

The air conditioning, indirect heating and recuperative ventilation system of the present invention is designated by 11. Conditioned air is supplied to the interior or enclosed space 13 of a room 15 and then removed and returned to the external environment 17. The enclosed space 13 includes a ventilating air inlet or supply register 19 and a ventilating air outlet or return register 21.

A supply air flow path 23 is provided for the supply and conditioning of fresh air from the external environment 17 to the enclosed space 13. This path is contained within: supply blower 55, first supply air duct 35, supply air heat exchange chamber 39, second supply air duct 41 and supply register 19; in which, these components are operably coupled together for the movement and conditioning of that fresh air.

A return air flow path 29 is provided for the use in temperature conditioning processes and return to the external environment 17 of spent air from enclosed space 13. This path is contained within: return register 21, first return air duct 45, return heat exchange chamber 49, second return air duct 53 and return blower 75; in which, these components are operably coupled together for the use and movement of that spent air to the external environment 17.

It is to be understood that supply air from supply register 19 moves throughout the enclosed space 13 and is changed as it performs its function of ventilating, heating or cooling, before that air becomes return air and enters return register 21.

In this apparatus, supply air heat exchange chamber 39 is located in intimate contact with return air heat exchange chamber 49, and that these two chambers are separated by only a heat exchange membrane 97. Heat exchange membrane 97 is of such a form and type as to facilitate the transference of heat between supply air in supply air heat exchange chamber 39 and return air in return air heat exchange chamber 49. Supply air heat exchange chamber 39, return air heat exchange chamber 49 and heat exchange membrane 97 are an integral structure and form the air to air counter-flow heat exchanger 95; where heat exchange membrane 97, is preferably a thin, heat conducting, gas impermeable, rigid metal or plastic structure.

In this preferred embodiment, a spray nozzle 107, water supply pipe 101 and valve 105 are provided, so that, water may be controlled and supplied to spray nozzle 107, so that, spray nozzle 107 may provide water spray 109 into return air heat exchange chamber 49 for the wetting and saturation of that chamber.

This preferred embodiment, also, includes heater 121 for heating the return air and is located in first return air duct 45 or any part of return air flow path 29 that is located upstream of return air heat exchange chamber 49 and downstream of return register 21. In this embodiment heater 121 is an electric resistance heater to which power is provided by power leads 123 and 125.

The enclosed space 13 of room 15 is typically subject to air leaks 117 out of enclosed space 13 and air infiltration 119 into that space.

For the purposes of this specification and the claims that follow, second supply air duct 41 and first return air duct 45, which are located in room 15, are not considered to be part of enclosed space 13, and in fact, in other embodiments, these ducts can be exterior to both enclosed space 13 and room 15.

In operation as an air conditioning system, electrical power is not fed to heater 121, valve 105 is opened and water is allowed to enter spray nozzle 107 and become water spray 109. Return air heat exchange chamber 49 becomes everywhere wet. Also, supply blower 55 and return blower 75 are turned on and operate to move air. Air from external environment 17 is drawn into and through supply blower 55, through first supply duct 35, through supply air heat exchange chamber 39, through second supply air duct 41, through supply register 19 and into enclosed space 13 as supply air. And at the same time, air from enclosed space 13 is drawn into return register 21 as return air and is further drawn through first return air duct 45, return air heat exchange chamber 49, second return air duct 53 and through return blower 75 and finally rejected to the external environment 17.

In return air heat exchange chamber 49 return air is simultaneously evaporatively cooled and heated in a reverse temperature profile, as previously described in patent 4,713,943; in which cooling effect is by water evaporation and heating is by heat conduction of heat across heat exchange membrane 97. The net effect is that return air in return air heat exchange chamber 49 rises in temperature as it passes through that chamber and absorbs heat from the heat exchange membrane 97.

In supply air heat exchange chamber 39 air from external environment 17 is cooled sensibly by heat exchange with the cooler heat exchange membrane 97, and that air is cooled to become supply air for enclosed space 13.

In operation as a recuperative ventilation system, water is turned off to spray nozzle 107 and power is not fed to heater 121, however, power is fed to supply blower 55 and return blower 75 to move air as before, but perhaps at a lower rate.

During the heating season, air from external environment 17 is heated by the return air from enclosed space 13 by means of heat conduction across heat exchange membrane 97 of air to air counter-flow heat exchanger 95.

Although, during the heating season, air rejected by return blower 75 is at a higher temperature than the air generally of the external environment 17, it is, nevertheless, at a substantially lower temperature than that in enclosed space 13. And although, the supply air entering enclosed space 13 is at a lower temperature than that generally in enclosed space 13, it is at a significantly higher temperature than the air generally in the external environment 17. Thus a ventilating air flow with the present invention does not, during the heating season, cool down enclosed space 13 as rapidly as it would were there no heat recovery by heat conduction in the air to air counter-flow heat exchanger 95. As a consequence, heating energy is conserved.

During the air conditioning season, air from external environment 17 is cooled by the return air from the enclosed space 13 by heat conduction across heat exchange membrane 97 of air to air counter-flow heat exchanger 95.

Although, during the air conditioning season, air rejected by return blower 75 is at a lower temperature than that of the air generally in the external environment 17, it is, nevertheless, at a substantially higher temperature than that in enclosed space 13. And although, the supply air entering enclosed space 13 is at a higher temperature than that generally in enclosed space 13, it is at a significantly lower temperature than the air generally in external environment 17. Thus the ventilating air flow with the present invention does not, during the air conditioning season, heat up enclosed space 13 as rapidly as it would were there no cooling recovery by heat conduction in the air to air counter-flow heat exchanger 95. As a consequence, cooling energy is conserved.

In operation, as a space heater, during the heating season, valve 105 is turned off, water is not supplied to spray nozzle 107, water spray 109 is not provided to return air heat exchange chamber 49, and electrical power is supplied to heater 121, supply blower 55 and return blower 75. Air from external environment 17 is drawn into supply blower 55 and forced through first supply air duct 35, supply air heat exchange chamber 39, second supply air duct 41, through supply register 19 and into enclosed space 13. Also, air from enclosed space 13 is drawn as return air through return register 21, through first return air duct 45, through return air heat exchange chamber 49, through second return air duct 53 and finally ejected through return blower 75 into external environment 17.

Heater 121, which is located in first return air duct, heats the return air flow, before that air flow enters air to air counter-flow heat exchanger 95. In air to air counter-flow heat exchanger 95, heated return air in return air heat exchange chamber 49 heats air in supply air heat exchange chamber 39 by heat conduction across heat exchange membrane 97. In this fashion, enclosed space 13 is heated or kept warm by heated supply air.

Significant heat can be lost in the heating season or gained during the cooling season if air leaks 117 or air infiltration 119 are not kept to a minimum. In order to minimize these heat losses and gains, two pumping devices are provided in the form of supply blower 55 and return blower 75. These blowers are designed and operated so as to minimize the pressure differential between the enclosed space 13 and the external environment 17, and thus, the magnitude of air leaks 117 and air infiltration 119.

With a high capacity and efficient air to air counterflow heat exchanger 95, as is the case with the type of system being described, most of the heating energy of the heater 121 is transferred to the supply air delivered to enclosed space 13. In this fashion, ion depletion and other contaminations that can occur by the supply air's direct contact with the heater is avoided.

Although electric resistance heating is described, other sources of heating are possible; for example, gas burning, oil burning and direct contact with hot liquids and gasses. These sources of heat could pose serious health and safety problems if they were used directly in the supply air flow stream.

This indirect type of heating is made economic and practical by the necessity of having a high capacity and efficient heat exchanger, such as the air to air counterflow heat exchanger 95 that is required for the indirect water evaporative cooling process of the present invention. Heat exchangers of lower capacity and efficiency would result in unacceptable levels of heat loss in the ventilating air flow.

Because air conditioning, heating and recuperative ventilation system 11 is of the open flow type, with no return flow, contaminants and pollution can not build-up in enclosed space 13. This feature is in contrast with conventional heating and air conditioning systems where the air in a typical building is continuously recycled with increasing high levels of pollution and resulting stale air. With this system, because of the high capacity of the heat exchanger required for water evaporative cooling, very high or even 100% make-up air ratios can be employed.

Because of the very high fresh air make-up ratio, the air conditioning, indirect heating and recuperative ventilation system 11 can solve many, if not most, of the "sick building syndromes" that are associated with conventional heating, ventilating and air conditioning systems.

Although a specific variant of the inventive system has been described, other variants are possible. For example; although only one of each supply air heat exchange chamber 39, return air heat exchange chamber 49 and heat exchange membrane 97 are described there is no change or effect if multiples of these units are present.

It will be obvious to those skilled in the art that various modifications, changes, alterations, variations, substitutions and the like can be made in the construction, design and materials thereof, and to the method contemplated for use thereof, without departing from the spirit and scope of the present invention which is only limited by the following claims.

What is claimed is:

1. A method of heating an enclosed space comprising the steps of:
   supplying ambient air from the external environment;
   heating said ambient air by means of an air to air heat exchanger to become heated supply air;
   supplying said heated supply air from said air to air heat exchanger to said enclosed space;
   moving said heated supply air through said enclosed space;
   heating said enclosed space with said heated supply air;
   reducing the temperature of said heated supply air in said enclosed space to become cold return air;
   withdrawing said cold return air from said enclosed space;
   heating said cold return air by means of an air heating means to become heated return air;
   reducing the temperature of said heated return air in said air to air heat exchanger to become exhaust air;
   discharging said exhaust air to said external environment;
   wherein, said ambient air is heated and said heated return air is cooled by means of an exchange of heat energy with each other in said air to air heat exchanger.

2. A system for heating an enclosed space by means of an airflow through said enclosed space;
   said system comprising: an air to air heat exchanger, an air heating means, an air conduit means and an air movement means;
   said air to air heat exchanger comprising: a supply air heat exchange chamber, a return air heat exchange chamber and a means for the transference of heat energy between air in said chambers;
   said air heating means being a means for heating said airflow from a heat source;
   said air conduit means comprising: a supply air conduit means and a return air conduit means;
   wherein, said supply air conduit means is a means for directing said airflow from the external environment, through said supply heat exchange chamber, to said enclosed space;
   whereby, said external environment is operably coupled to said supply air heat exchange chamber and said supply air heat exchange chamber is operably coupled to said enclosed space for the movement and conveyance of said airflow from said external environment, through said supply air heat exchange chamber, and into said enclosed space;
   wherein, said return air conduit means is a means for directing said airflow from said enclosed space, through said heating means, through said return air heat exchange chamber and back to said external environment;
   whereby, said enclosed space is operably coupled to said air heating means, said air heating means is operably coupled to said return air heat exchange chamber and said return air heat exchange chamber is operably coupled to said external environment for the movement and conveyance of said airflow from said enclosed space, through said air heating means, through said return air heat exchange chamber and finally back to said external environment;
   whereby, said air movement means is a means for the movement of said airflow through said air conduit means and through said enclosed space.

3. A system in accordance with claim 2, wherein, said air movement means comprises: a supply air movement means and a return air movement means;
   wherein, said supply air movement means is a component part of said supply air conduit means and is a means of moving said airflow through said supply air conduit means;

wherein, said return air movement means is a component part of said return air conduit means and is a means of moving said airflow through said return air conduit means;

wherein, said supply air movement means and said return air movement means are of such capacities and are operated at such rates so as to achieve a pressure balance between said enclosed space and said external environment;

whereby, said supply air movement means and said return air movement means are a means for the movement of said airflow from said external environment, through said supply air conduit means, through said enclosed space, through said return air conduit means and finally back to said external environment;

whereby, said system conserves heat energy during heating by reducing to acceptable levels air leaks from said enclosed space to said external environment and air infiltration into said enclosed space from said external environment.

4. A system in accordance with claim 2, in which said means for the transference of heat energy between said air in said chambers is a heat conducting membrane, wherein, said heat conducting membrane forms a common wall between said supply air heat exchange chamber and said return air heat exchange chamber.

5. A system to ventilate an enclosed space by means of an airflow through said enclosed space, comprising;

an air to air heat exchanger, an air conduit means and an air movement means;

said air to air heat exchanger comprising: a supply air heat exchange chamber, a return air heat exchange chamber and a means for the transference of heat energy between air in said chambers;

said air conduit means comprising: a supply air conduit means and a return air conduit means;

wherein, said supply air conduit means is a means for directing said airflow from said external environment, through said supply heat exchange chamber and to said enclosed space;

whereby, said external environment is operably coupled to said supply air heat exchange chamber and said supply air heat exchange chamber is operably coupled to said enclosed space for the movement and conveyance of said airflow from said external environment, through said supply air heat exchange chamber and into said enclosed space;

wherein, said return air conduit means is a means for directing said airflow from said enclosed space, through said air heating means, through said return air heat exchange chamber and back to said external environment;

whereby, said enclosed space is operably coupled to said air heating means, said air heating means is operably coupled to said return air heat exchange chamber and said return air heat exchange chamber is operably coupled to said external environment for the movement and conveyance of said airflow from said enclosed space, through said air heating means, through said return air heat exchange chamber and finally, back to said external environment;

wherein, said air movement means comprises of a supply air movement means and a return air movement means;

wherein, said supply air movement means is a component part of said supply air conduit means and is a means of moving said airflow through said supply air conduit means;

wherein, said return air movement means is a component part of said return air conduit means and is a means of moving said airflow through said return air conduit means;

whereby, said supply air movement means and said return air movement means move said airflow from said external environment, through said supply air conduit means, through said enclosed space, through said return air conduit means and finally, back to said external environment;

wherein, said supply air movement means and said return air movement means are of such capacities and are operated at such rates so as to achieve a pressure balance between said enclosed space and said external environment;

whereby, said system conserves heat energy during ventilation by reducing to acceptable levels air leaks from said enclosed space to said external environment and air infiltration into said enclosed space from said external environment.

6. A system in accordance with claim 5, in which said air to air heat exchanger is a counterflow, air to air, heat exchanger.

7. A means of balancing the air pressure of an enclosed space with the pressure of the external environment, during the processes of heating, ventilating and air conditioning with an airflow, comprising:

a first air conduit means and a first air pumping means for withdrawing said airflow from said external environment and supplying said airflow to said enclosed space;

a second air conduit means and a second air pumping means for withdrawing said airflow from said enclosed space and supplying said airflow to said external environment;

wherein, said first conduit means and said second air conduit means contains all elements of heating, air conditioning and ventilating equipment through which said airflow passes;

wherein, said first air pumping means and said second air pumping means are of such capacities and are operated so as to achieve a pressure balance between the air in said enclosed space with the air in said external environment;

whereby, said pressure balancing reduces to an acceptable minimum air infiltration into said enclosed space from said external environment and air leaks out of said enclosed space to said external environment and conserves heat energy.

* * * * *